United States Patent
Deininger (10) Patent No.: US 6,391,142 B1
(45) Date of Patent: May 21, 2002

(54) METHOD OF BONDING SUBSTRATES

(76) Inventor: Steven T. Deininger, 8103 Foxberry Bay, Savage, MN (US) 55378

(*) Notice: Subject to any disclaimer, the term of this patent is extended or adjusted under 35 U.S.C. 154(b) by 0 days.

(21) Appl. No.: 09/479,580

(22) Filed: Jan. 7, 2000

(51) Int. Cl.[7] .............................................. B32B 31/00
(52) U.S. Cl. ...................... 156/278; 156/308.2; 156/323
(58) Field of Search ................................ 156/323, 278, 156/308.2

(56) References Cited

U.S. PATENT DOCUMENTS

| | | | |
|---|---|---|---|
| 2,698,273 A | * 12/1954 | Miner et al. | 156/308.2 |
| 3,245,862 A | * 4/1966 | Olij et al. | 156/324 |
| 3,547,753 A | * 12/1970 | Sutton | 156/308.2 |
| 3,562,059 A | * 2/1971 | Gladen | 156/323 |
| 5,336,208 A | 8/1994 | Rosenbluth et al. | |
| 6,190,486 B1 | * 2/2001 | Switlik | 156/308.2 |

FOREIGN PATENT DOCUMENTS

| | | |
|---|---|---|
| DE | 3722873 A1 | 4/1989 |
| EP | 0 756 924 A2 | 2/1997 |
| FR | 2 361 213 | 3/1978 |
| WO | WO 99/44532 A1 | 9/1999 |

* cited by examiner

Primary Examiner—John J. Gallagher
(74) Attorney, Agent, or Firm—Jeffrey J. Hohenshell (57) ABSTRACT

A substrate is permanently bonded to a thermoplastic member by applying a sufficient degree of heat and pressure. Thermoplastic is notoriously non-receptive to even the most aggressive adhesives. As such, it has been extremely difficult to attach non-plastic components to thermoplastic products. To avoid this problem, the thermoplastic product is heated, on one side, to a temperature just below its melting point. A substrate, made of a material such as polyethylene, is placed against the non-heated side of the thermoplastic. As heat passes through the thermoplastic, it heats and eventually melts a portion of the substrate. Ideally pressure is applied to force the melted material against the substrate. The materials are then allowed to cool and harden, thus forming a permanent bond between them. Additional materials may be coupled to the substrate, as desired.

28 Claims, 5 Drawing Sheets

METHOD OF BONDING SUBSTRATES

BACKGROUND OF THE INVENTION

1. Field of the Invention

The present invention relates generally to a method of bonding substrates to a thermoplastic base. More specifically, the present invention is a method of utilizing heat and pressure to form a permanent bond between a foam or substrate, such as polyethylene, and a thermoplastic base. The foam is controllably melted while in direct contact with the base and then subsequently allowed to cool and solidify, thus forming a permanent bond.

2. Description of the Related Art

Plastic has become the material of choice for a plethora of applications due to its ability to be easily formed or molded into a desired product. It is easy to work with, reliable, cost effective, and durable. Most importantly for many medical applications, plastic is safe for most human interactions. Additionally, plastic products can be routinely manufactured in bulk, thus achieving savings which will make the final product more cost effective, and hence more marketable.

Due to the ability to make consistent, high quality products relatively inexpensively, it has become fairly common to provide the end user with a bulk supply of an item; thus allowing for a single use of a particular product. In other words, a quantity of disposable items is provided rather than a single, reusable item. Often times this is advantageous in that reusing a product, especially for medical purposes, may be unsanitary or simply impractical.

One common way of making products out of plastic is to use an injection molding process. A polymer thermoplastic is heated into a liquid state and then injected into a rigid mold. The mold forms the outer periphery of the shape of the completed product. The plastic is then allowed to harden and a completed product is achieved. This is a very effective method of mass producing plastic products and allows for an infinite number of design possibilities. One particular advantage of injection molding is the ability to make relatively small components. Another advantage is the ability to disperse the plastic into a relatively thin substrate, thus forming a sturdy, yet flexible member.

One drawback to the use of some thermoplastics is the inability to adhere other materials to the completed product. The nature of the plastic used precludes an effective use of most, if not all known adhesive products. The low surface energy of the plastic, combined with the oils present in the plastic, cause even the most aggressive adhesives to separate with a minimum force. As such, a real difficulty is presented if the attachment of another component is necessary.

Manufacturers and end users have been unable to find a solution that allows a component or substrate to be adhered to a product made of thermoplastic. One way of avoiding the problem has been to configure the thermoplastic product such that an interlock is created. For example, a molded automobile dash generally covers a layer of foam. The foam cannot easily be adhered to the dash, so the dash is shaped to partially encase the foam. While this is an adequate solution in some situations, the concept cannot be employed with most other products.

Often the product itself must be uniquely configured to carry out its particular purpose. For example, the inventor has developed an incontinence device for females. The device consists of a generally flat, teardrop shaped plastic membrane made from thermoplastic. The membrane has a flexible tubular protuberance that snaps between an open and closed position. A pullstring is attached to the flexible portion of the device. The protuberance has several small holes and acts as a simple valve. In the open position, fluid is allowed to flow through the holes. In the closed position, the flexible portion is pushed against the remainder of the protuberance, thus preventing fluid from passing through the holes.

The device is placed and retained over the meatus of the female urethra. Urine is prevented from passing through when the device is in a closed position. When desired, the pull string is pulled, causing the valve to open. The device represents a comfortable and cost effective solution to a very embarrassing problem for a large number of females. Women who suffer from incontinence often find their lives seriously disrupted. Due to both the embarrassment which would occur from a public accidental voiding, and the perceived risk of such an event, many women feel they have no choice but to forgo many or most activities in public places. The device is safe, easy to use, and very reliable. As such, it gives incontinent women sufficient confidence to resume the normal course of their lives.

The main body of this device is made using injection-molding techniques to appropriately form thermoplastics. The injection molding process provides a fully functional valve, coupled to a teardrop shaped membrane. However, there is no way to effectively attach the plastic valve to the body. Ideally, an adhesive could be used to form a tight seal with the patient. Also, the adhesive must be separable from human skin with little or no irritation as well as being able to interact with bodily fluids. As mentioned above, however, adhesives applied to the plastic will simply separate as the slightest amount of force is applied. This dictates that less aggressive adhesives must be utilized, which are even less effective in bonding to thermoplastics.

As can be imagined, unintentional separation of the product would have a disastrous effect both for the woman attempting to use the device and the company trying to market it. Obviously for a woman to use such a device and venture into public, she must have a certain degree of confidence in the product. If the adhesive separates (as it inevitably would) and the woman is embarrassed, it would be extremely difficult and most likely impossible to ever regain that woman's trust in the product and possibly even the company making the product.

As such, there exists a need to provide a method of adhering material to a thermoplastic substrate. In particular, there exists a need of providing an adhesive layer on a thermoplastic substrate.

SUMMARY OF THE INVENTION

The present invention utilizes heat and pressure to permanently bond an intermediate substrate, such as polyethylene, directly to a thermoplastic substrate. The polyethylene substrate provides a layer to which virtually any other item, including adhesives, can be affixed with ease and reliability.

The thermoplastic product is placed on a heating fixture that heats the underside (as positioned) of the plastic. The polyethylene layer (intermediate substrate) is placed on top of the thermoplastic product, opposite the heating fixture. A press is then lowered, sandwiching the intermediate substrate and providing a predetermined amount of pressure. The heating fixture is then maintained at a temperature slightly below the melting point of the thermoplastic (preferably about 10° F. below) and slightly above the melting point of the polyethylene.

As the pressure is increased by the press, the heating of the layers is accelerated. The intermediate substrate acts as an insulator, trapping the heat between itself and the thermoplastic product. This causes the lower portion, but only the lower portion, of the intermediate substrate to melt while the press forces this melted material against the thermoplastic. As is known, thermoplastic softens as it is heated. As such, the softened thermoplastic product interacts with the partially melted intermediate substrate. Pressure is then removed by raising the press. The product is then allowed to cool. As it cools, the melted intermediate substrate permanently bonds to the softened thermoplastic. Since only the lower portion of the intermediate substrate melted, the remainder remains perfectly intact. As such, other products can now be placed atop the intermediate substrate. This alleviates the aforementioned problems in bonding adhesives to thermoplastics by providing the intermediate substrate to which the adhesive can be applied. The bond formed between the intermediate substrate and the thermoplastic is permanent and incredibly strong. Forcibly pulling apart the layers results in a tearing of the intermediate substrate, not in a separation of the bond therebetween.

With the incontinence device, the intermediate substrate is made up of polyethylene. This layer of polyethylene acts as a padding that makes the product even more comfortable. While the thermoplastic used is relatively pliable (specifically, a styrene ethylene-butylene styrene modified block copolymer), this additional level of comfort is beneficial. As previously discussed, the adhesive applied to this product must securely bind to the skin, but upon separation it should not create undue irritation. One appropriate product is a water-based hydrogel. The final product then comprises a layer of thermoplastic bonded to a layer of polyethylene, with a layer of hydrogel applied over the polyethylene. Covering the hydrogel is a release layer, which is simply peeled away before use, exposing the tacky hydrogel.

Applying each of these layers separately to such a relatively small component would be cumbersome and costly. Therefore, large sheets of polyethylene are provided and are uniformly precoated on one surface with the hydrogel. Subsequently, a large sheet of the release layer is placed atop the hydrogel. This layered product is then die cut to match the teardrop shape of the incontinence device.

As mentioned, hydrogel is water based. Therefore if it is subjected to heat it will rapidly evaporate which eliminates its effectiveness. In the method of the present invention, the layered product is placed atop the thermoplastic valve. The unheated press is applied against the release layer, while heat is applied to the underside of the thermoplastic. In this way, the release layer and hence the hydrogel are never directly heated. The additional advantage of this process is that the heating of the hydrogel is avoided by exploiting the insulating characteristics of polyethylene. Not only does this insulative effect prevent the upper portion of the polyethylene from melting, it prevents any significant amount of heat from reaching the hydrogel.

Materials other than polyethylene can be utilized equally well so long as the materials are chosen so that their melting point is below that of the thermoplastic used, and ideally it is relatively close to that of the thermoplastic. The present application presents this method with reference to creating an incontinence device, however the method is applicable to bonding a substrate to a thermoplastic for any purpose. The amount of time and the amount of pressure applied are product dependent variables. Sufficient time must be permitted to melt a sufficient quantity of the substrate, while too much time could eliminate the insulative benefits provided by the substrate. The pressure applied serves to accelerate this process, as the correlation of heat to pressure is well understood. As such, the level of pressure applied should be selected so as to not damage or permanently deform any of the elements being joined.

It is an object of the present invention to provide a method of permanently bonding a substrate to a thermoplastic product.

It is another object of the present invention to provide a method of placing and retaining an adhesive on a thermoplastic product.

It is yet still another object of the present invention to provide a method of utilizing heat to bond a substrate to a thermoplastic product.

It is still another object of the present invention to provide a method of utilizing heat and pressure to bond a substrate to a thermoplastic product.

It is still a further object of the present invention to provide a method for utilizing heat to bond a substrate to a thermoplastic product wherein the substrate includes a sensitive material that is shielded from the heat.

It is still yet a further object of the present invention to provide a method of bonding a polyethylene layer bearing a hydrogel adhesive onto a thermoplastic incontinence device.

DETAILED DESCRIPTION OF PREFERRED EMBODIMENTS

Figure 1:
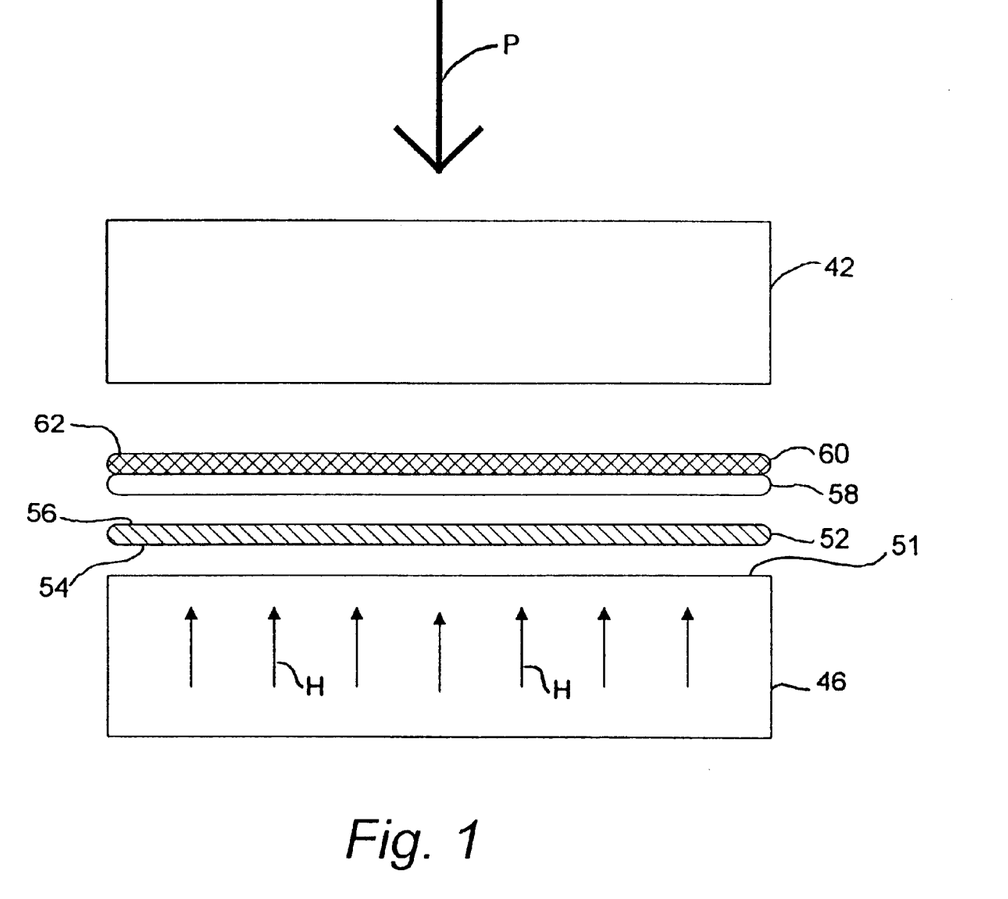
FIG. 1 is a schematic illustration of a heated press utilized to bond a substrate to a thermoplastic layer.

The present invention relates generally to a method for permanently bonding a substrate to a thermoplastic product. More specifically, this process provides the ability to apply an adhesive to a thermoplastic substrate. This process was initially established to bond an adhesive bearing substrate of polyethylene to a device formed from thermoplastic. Referring to FIG. 1, the process is illustrated in broad context. A heating block 46 is provided which is able to achieve and maintain a predetermined temperature. The heating surface 51 of heating block 46 should be shaped to conform to the natural shape of thermoplastic layer 52. Thermoplastic layer 52 is meant to be representative of any component (or part of a component) made from thermoplastic, to which another component needs to be coupled.

The component to be coupled to the thermoplastic layer 52 is an intermediate substrate 58. Intermediate substrate 58 can be made from virtually any material, such as polyethylene, which has a melting point below the melting point of the thermoplastic being utilized. It is to be understood that the melting points of different types of thermoplastics will vary, thus making the particular class of material available as intermediate substrate 58 dependent upon the thermoplastic ultimately utilized. Though not required, it is advantageous if intermediate substrate 58 acts as a heat insulator.

To bond the intermediate substrate 58 to the thermoplastic layer 52, a first surface 54 of thermoplastic layer 52 is placed in contact with the heating surface 51 of heating block 46. Intermediate substrate 58 is then placed in contact with a second surface 56 of thermoplastic layer 52. In this way, first surface 54 is heated directly by heating block 46. As heat transfers through thermoplastic layer 52, intermediate substrate 58 eventually becomes heated.

A press 42 is actuated in the direction of arrow P and causes intermediate substrate 58 to flushly abut thermoplastic layer 52. As time passes and the temperature of the components rise, thermoplastic layer 52 softens and at least a portion of bridging substrate 58 melts.

Subsequently, press 42 is removed and the components are allowed to cool. Once done, the intermediate substrate 58 has been permanently bonded to thermoplastic layer 52.

If desired, one or more secondary substrates 60 can be attached to the unheated side of bridging substrate 58, prior to the bonding process. Since the secondary substrates 60 will not be heated, various sensitive materials and those materials which would not otherwise fall within the class available for intermediate substrate 58, can be coupled to a thermoplastic layer 52. For example, the secondary substrate 60 could be various adhesives which cannot be easily bonded to the thermoplastic layer 52.

It is possible to forego the use of press 42 and still bond the intermediate substrate 58 to the thermoplastic layer 52, while only providing a source of heat. This process will take longer, and will not necessarily produce the same quality of bonding. When using the press 42, the pressed surface 62 (the material exposed to the press 42) and any intermediate layers will dictate the amount of pressure applied. The amount can range from none; not using press 42 or simply using it to hold or guide the materials, to an amount just short of damaging the materials. The more pressure applied, the less time the bonding process will take.

It is also possible to alter the condition of the materials (the foam and thermoplastic layers) using methods other than heating. For example, ultrasonic energy could be used to form a permanent bond between the intermediate substrate 58 and the thermoplastic layer 52. Alternatively, rf energy could be directed toward the interface, again creating a bond.

Figure 8:
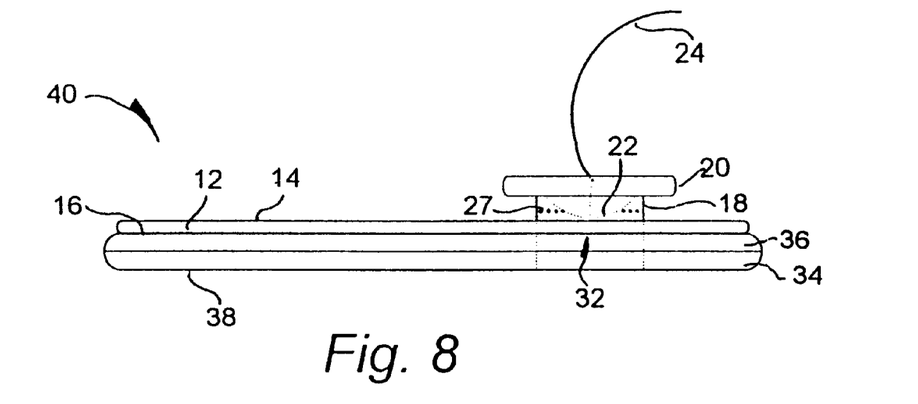
FIG. 8 is a side planar view of a completed incontinence device, shown in a closed position.

The process will now be described with reference to the specific application of an incontinence device. It is to be understood that the process is applicable to a broad range of uses and materials, as will also be described. Referring to FIGS. 2–5, a molded incontinence component 10 is shown. The molded incontinence component 10 is the first component to be produced that will eventually be utilized to form a completed incontinence device 40 (FIG. 8). The molded incontinence component 10 is injection molded from an elastomer thermoplastic, such as C-Flex TPE Thermoplastic made by Concept Polymer Technologies, Inc. of Largo, Fla. The device 10 is molded in bulk; that is many of the products are formed simultaneously and are interconnected. Afterwards, they are allowed to cool and harden. Finally, they are separated into individual units, as illustrated.

In a preferred embodiment, the molded incontinence component 10 has a substantially teardrop shaped main body 12. Main body 12 is relatively thin and flexible allowing it to conform to the anatomical shape of the patient, while still providing an impermeable membrane. Main body 12 has an upper surface, 14 and a lower surface 16. Extending from the upper surface 14 is a hollow tube 18 that is coupled to a lip 20 at one end, and a terminus 28 at the other. The terminus 28 of tube 18 forms a hole or passageway through the main body 12.

Figure 2:
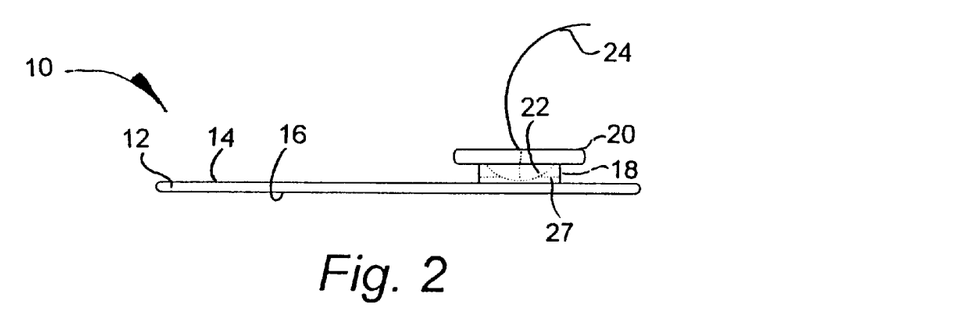
FIG. 2 is a side planar view of a thermoplastic portion of an incontinence device shown in a closed position.
Figure 3:
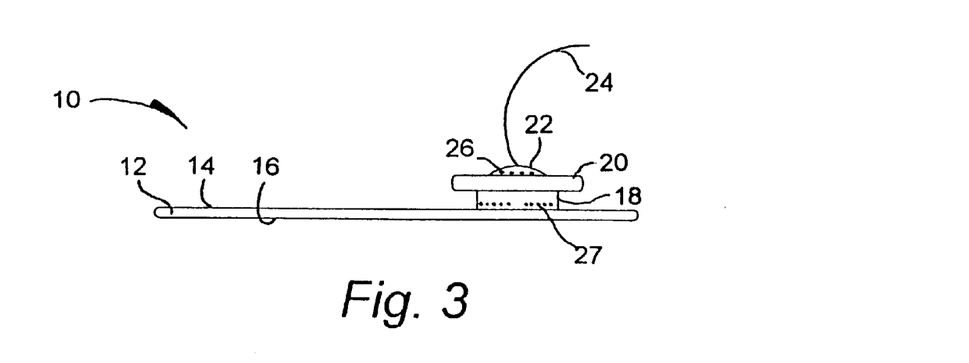
FIG. 3 is a side planar view of a thermoplastic portion of an incontinence device shown in an open position.
Figure 4:
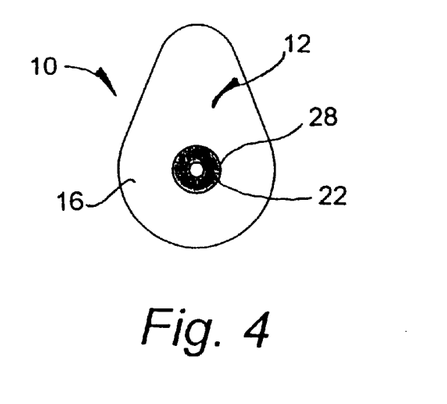
FIG. 4 is a bottom, planar view of a thermoplastic portion of an incontinence device shown in a closed position.

A flexible diaphragm 22 is coupled at its periphery to the junction of the tube 18 and lip 20. The flexible seat is a thin membrane that seals the upper portion of tube 18. Flexible diaphragm 22 has a number of small holes 26 bored therethrough. Flexible diaphragm 22 is biased to flex between a closed position, as shown in FIG. 2, and an open position, as shown in FIG. 3. A pull string 24 of molded plastic is coupled to the flexible diaphragm 22 and allows the patient to pull flexible diaphragm 22 from the closed position to the open position. The patient simply presses directly against the flexible diaphragm 22 in order to move it from the open position to the closed position.

Figure 5:
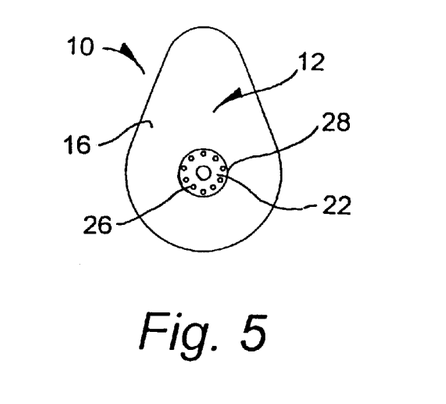
FIG. 5 is a bottom, planar view of a thermoplastic portion of an incontinence device shown in an open position.

When flexible diaphragm 22 is in an open position (FIGS. 3 & 5), fluid is able to pass through tube 18. The fluid travels through tube 18 and out through holes 26. When closed (FIGS. 2 & 4), fluid is prevented from passing through tube 18. When flexible diaphragm 22 is in the closed position, it is arched towards lower surface 16 and a portion of flexible diaphragm 22 passes through an opening in middle membrane 27, thus sealing off that opening. In the open position, as shown in FIG. 5, flexible diaphragm 22 is arched towards upper surface 14 and the opening in middle membrane 27 is no longer occluded.

Figure 6:
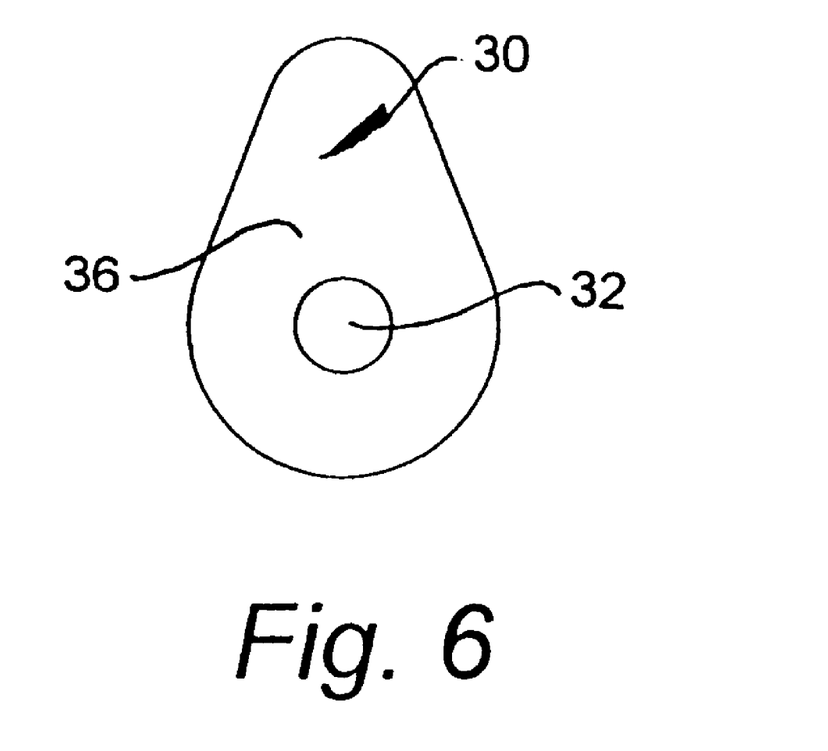
FIG. 6 is a top planar view of a teardrop shaped die cut substrate including a polyethylene layer and a hydrogel layer.
Figure 7:
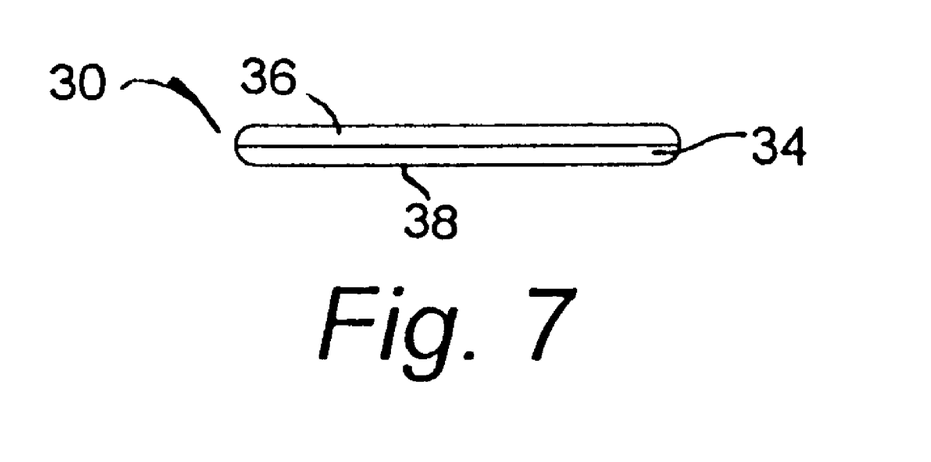
FIG. 7 is a side planar view of a teardrop shaped die cut substrate including a polyethylene layer and a hydrogel layer.

Molded incontinence component 10 is a complete and functioning valve assembly. However, there is no mechanism by which is may be attached to the female anatomy. FIG. 6 and 7 illustrate one possible attachment mechanism. A polyethylene teardrop 30 is formed, having a shape and size matching the teardrop configuration of the lower surface 16 of molded incontinence component 10. Polyethylene teardrop 30 is comprised of two layers; a polyethylene layer 36, and a hydrogel layer 34. The polyethylene layer 36 is in the form of compressible foam. The hydrogel layer is a tacky, water based adhesive that has the desired bonding characteristics with human flesh. Hydrogel is a hypoallergenic, pressure sensitive acrylate adhesive. A release liner 38 is added to allow for easy handling of the incontinence device 40 prior to patient use. Release liner 38 is a membrane that temporarily bonds to the hydrogel, preventing it from accidentally adhering to undesired surfaces. At the appropriate time, the release liner 38 is simply peeled away, exposing the hydrogel. For purposes of illustration, release liner 38 is simply shown as the edge of hydrogel layer 34, as release liner 38 is a very thin, transparent membrane.

Any suitable method to form polyethylene teardrop 30 is acceptable. An efficient way of providing the component includes uniformly covering a relatively large sheet of polyethylene with a layer of hydrogel. Subsequently, a large sheet of the release layer is placed over the hydrogel. This sandwiched product is then die cut to form a plurality of the appropriate shapes, here polyethylene teardrop 30. For use in the incontinence device 40, a throughbore 32 is also formed during the die cutting process. Throughbore 32 provides an opening through which fluid is allowed to pass.

FIG. 8 illustrates the incontinence device 40 in its completed form. The polyethylene layer 36 of teardrop 30 has been bonded to the lower surface 16 of molded incontinence device 10. In use, the female patient removes release liner 38, exposing the hydrogel layer 34. The incontinence device 40 is then positioned over the meatus of the urethra and the surrounding tissue. In particular, the throughbore 32 and tube 18 are aligned with the meatus. The hydrogel layer 34 bonds to the flesh, providing a fluid tight seal. Due to the medical condition of patients using this device, the various components utilized, especially the adhesive, must be able to withstand constant interaction with bodily fluids, and this is achievable with the hydrogel layer 34. The female patient then checks to make sure the flexible diaphragm 22 is in the closed position (FIG. 8) by pressing inwardly with a finger against the upper portion of flexible diaphragm 22. In this position, the device 40 prevents any fluid from passing and thereby prevents any embarrassing situations from occurring. When the female patient wishes to void, the pullstring 24 is pulled thus moving flexible diaphragm 22 from the closed position to the open position (FIG. 3). Now, fluid is able to pass through tube 18 and out through the holes 26. One great advantage of this device is that the patient is able to void without having to remove the completed incontinence device 40. Upon completion, the patient simply closes the valve and is able to confidently resume her daily activities without the fear of embarrassment.

Figure 9:
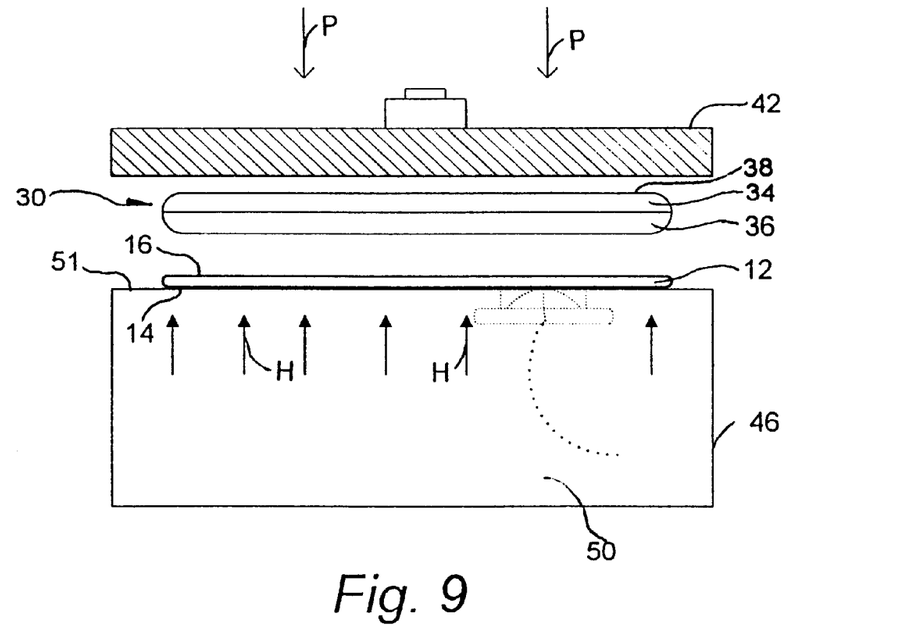
FIG. 9 is a schematic, partially sectional side view illustrating a heating press utilized to bond a hydrogel coated, polyethylene layer to a thermoplastic substrate, with the press shown in an open position.
Figure 10:
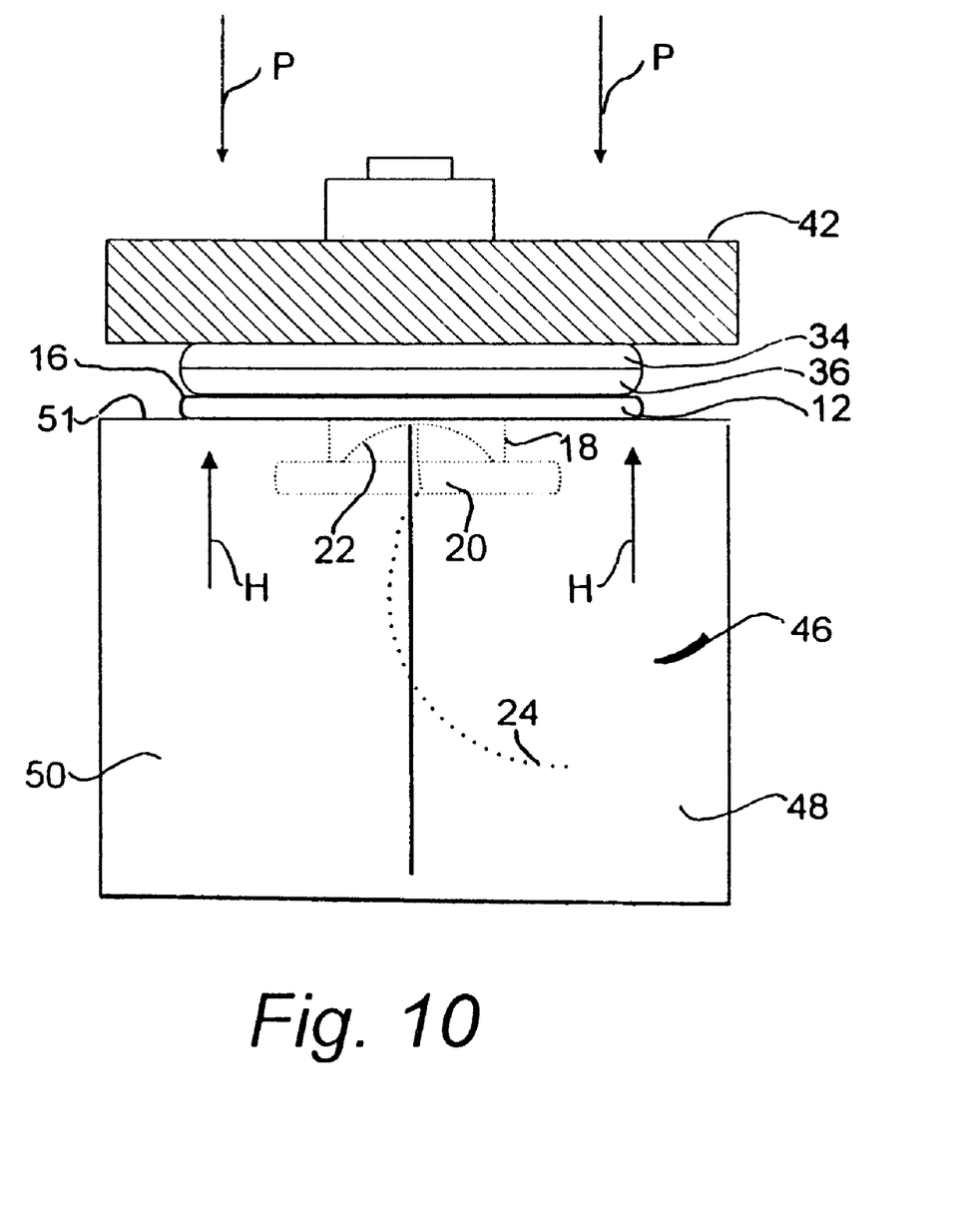
FIG. 10 is a schematic, partially sectional end view illustrating a heating press utilized to bond a hydrogel coated, polyethylene layer to a thermoplastic substrate, with the press shown in a closed position.

In order to form the completed incontinence device 40, the polyethylene teardrop 30 must be attached to the lower surface 16 of molded incontinence device 10. As previously discussed, there is no available adhesive or previously known alternative method which could adequately perform this task. The present method utilizes heat and pressure to optimally and permanently bond the polyethylene layer 36 to lower surface 16. To accomplish this, molded incontinence component 10 is clamped into heating block 46, as shown in FIGS. 9 and 10. Heating block 46 is comprised of two pieces, right section 48 and left section 50. Right section 48 and left section 50 are at least partially separable from one another and provide an appropriate configuration to receive tube 18, lip 20 and pullstring 24 between them. Closing the sections 48 and 50 around tube 18 holds molded device 10 in place. The upper surface 14 is in contact with a heating surface 51 of heating block 46. Lower surface 16 is exposed and unencumbered.

A polyethylene teardrop 30 is then placed atop the molded device 10, so that the polyethylene layer 36 is in contact with lower surface 16. Accordingly, release liner 38 then becomes the exposed and unencumbered surface. Once this arrangement is achieved, a press 42 is forced downward, in the direction of arrow P, pressing the various layers together and achieving the configuration illustrated in FIG. 9.

Heating surface 51 of heating block 46 is maintained at a temperature sufficient to melt the polyethylene, but insufficient to melt the thermoplastic. In the preferred embodiment, with the particular materials chosen, the heating block 46 is set at approximately 277° F., which will melt polyethylene but is approximately 10° F. below the melting point of the thermoplastic. As such, when press 42 applies force, the upper surface 14 is rapidly raised to this temperature and this heat is transferred through the thermoplastic and into polyethylene layer 36 (direction of arrow H). The polyethylene layer 36 acts as an effective insulator, trapping most of the heat generated between the lower surface 16 and the contacting surface of the polyethylene layer 36. Therefore, a fraction of the polyethylene is caused to melt, while the remainder of the polyethylene remains perfectly intact.

While the thermoplastic is not caused to melt, the heat generated is sufficient to substantially soften the material. Therefore, under the pressure generated by press 42, the melted portion of the polyethylene interacts with the softened thermoplastic and the two materials intertwine. When sufficient time has passed (approximately 8 seconds, in the preferred embodiment), the press 42 is removed and the components are removed from heating block 46 and allowed to cool. As this occurs, the thermoplastic hardens and the polyethylene solidifies and a permanent bond is formed between the two. The bond is exceptionally strong. If an attempt is made to forcibly peel the polyethylene from the thermoplastic, the polyethylene itself will tear or shear; however, the bond will not be undone.

During this process, the unmelted portion of polyethylene layer 36 acts as an insulator. As mentioned, this serves to accelerate the melting process. In addition, this serves to protect the hydrogel layer 34. Hydrogel is a water based adhesive and exposure to the levels of heat generated by heating block 46 would cause it to evaporate quickly, rendering it useless. Since the press 42 is unheated and the polyethylene acts as an insulator, hydrogel layer 34 is never exposed to significant amounts of heat, either directly or indirectly.

While the method has thus far been described with reference to certain specific parameters, these parameters are also quite fungible. A portion of the polyethylene layer 36 must be caused to melt, and this melted material must be placed in contact with the thermoplastic lower surface 16. Subsequently, the materials must be allowed to cool and form a bond. The remaining variables can be used to make the process more efficient and may also be used to increase the quality of the bond. For example, the process could be done without the use of press 42 or similar pressure causing means. The use of press 42 serves to accelerate the heating of the various layers by keeping them in close contact, removing air pockets, and maximizing surface contact by flattening the layers. Additionally, the press 42 forces the melted polyethylene against the softened thermoplastic, thus assuring that the two materials become sufficiently intertwined. This is also aided by the fact that it is the heated thermoplastic that actually heats and melts the polyethylene.

As such, it is advantageous to use press 42, or a similar pressure-creating device, though it is not mandatory. The amount of pressure applied by press 42 will vary with the materials selected to achieve the desired result and can range from applying no force at all to an amount of force just short of damaging the components. Of course, there may be instances where it is desired to use the heat and/or pressure to alter one or more of the components and then whatever level of pressure/heat is necessary can be selected. For example, the molded incontinence component 10 has a flexible diaphragm 22 that is moved between an open and a closed position. Due to the nature of the device, it is desirable to bias the device so that it maintains its closed position. To do this, the molded device 10 is placed into the heating block 46 with the flexible diaphragm 22 in the closed position. The heat generated serves to form a "snap action" at the junction of the flexible diaphragm 22 to lip 20. This causes the flexible diaphragm 22 to remain in the position it is placed in, and also gives the operator a positive response when it is actuated, indicating a change in position.

Under manufacturing conditions, where the process will be repeated continually, the various components, including the press 42 may begin to heat. If this is left unchecked, it may adversely affect the hydrogel layer 34, release layer 28 or the upper portion of polyethylene layer 36. To avoid this, press 42 can be cooled by various known means to prevent this undesirable heating. This will also allow press 42 to act as a heat sink should any of the upper layers inadvertently become heated.

The temperature of the heating block 46 should preferably be selected at just over the melting point of polyethylene and just under the melting point of the thermoplastic. With the particular material utilized in the preferred embodiment, a temperature of 277° F. is sufficiently above the polyethylene melting point and about 10° F. below the melting point of the thermoplastic. Leaving the components in place to be heated under pressure for approximately 8 seconds produces the desired result. These variables could, of course, be adjusted. For example, higher temperatures could be used for shorter times or with less pressure. The particular selection must be balanced between the need for speed for the strength of the bond desired.

The method of bonding described above could easily be used for multiple applications. For example, it may be desirable to attach a similar flexible device to a patient's ears for hearing protection. In this application, it could be equally beneficial to utilize the same type of materials for the components, although the overall configuration may vary.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments that have been described in detail therein. Rather, reference should be made to the appended claims as indicative of the scope and content of the present invention.

What is claimed is:

1. A method of bonding an intermediate substrate to a thermoplastic member, comprising:

placing a first surface of the thermoplastic member against a heating block;

placing a first surface of the intermediate substrate against a second surface of the thermoplastic member;

coupling a heat sensitive material to a second surface of the intermediate substrate;

heating the first surface of the thermoplastic member to a predetermined temperature and allowing sufficient time for heat to transfer through the thermoplastic member to at least a portion of the first surface of the intermediate substrate;

limiting the heating of the first surface of the intermediate substrate so as not to allow the heat sensitive material to be exposed to detrimental levels of heat;

allowing the thermoplastic member and the intermediate substrate to cool, thus forming a permanent bond; and wherein the heat sensitive material is a layer of adhesive.

2. The method of claim 1, further comprising:

applying force against the intermediate substrate by moving a press towards the heating block.

3. The method of claim 2 wherein the amount of force applied is just sufficient to hold the intermediate substrate against the thermoplastic member.

4. The method of claim 2 wherein the amount of force applied is less than that required to permanently damage or deform the intermediate substrate or the thermoplastic member.

5. The method of claim 1 wherein the intermediate substrate is polyethylene.

6. The method of claim 1 wherein a layer of release material is applied over the adhesive prior to placing the substrate against the second surface of the thermoplastic member.

7. The method of claim 1 wherein the adhesive is a hydrogel.

8. The method of claim 2 wherein the step of coupling a heat sensitive material to a second surface of the intermediate substrate takes place prior to the step of placing a first surface of the intermediate substrate against the second surface of the thermoplastic member.

9. The method of claim 8 wherein a layer of release material is applied over the adhesive prior to the step of placing a first surface of the intermediate substrate against the second surface of the thermoplastic member.

10. The method of claim 1 wherein the adhesive is an acrylate adhesive.

11. The method of claim 1 wherein the thermoplastic member is a molded incontinence component including a valve portion of a female incontinence device and the additional material is an adhesive used to secure a completed incontinence device to a female patient.

12. A method of bonding a substrate to a thermoplastic member, comprising:

placing a first surface of the substrate in contact with a first surface of the thermoplastic member;

coupling a heat sensitive material to a second surface of the substrate; wherein the heat sensitive material is an adhesive;

heating a second surface of the thermoplastic member, allowing sufficient time for the heat to transfer into and melt a portion of the substrate;

limiting the heating of the second surface of the substrate so as to prevent damage to the heat sensitive material from the heat; and allowing the substrate and the thermoplastic member to cool, thus forming a permanent bond.

13. The method of claim 12, further comprising:

pressing the heat sensitive material against the substrate, which is then pressed against the thermoplastic member at least during a portion of a time when the substrate is melted.

14. The method of claim 12 wherein the substrate is polyethylene.

15. The method of claim 12 wherein a release layer is placed over the adhesive.

16. The method of claim 12 wherein the adhesive is a hydrogel.

17. The method of claim 12 wherein the substrate is chosen from a class of materials having a melting temperature below a melting temperature of the thermoplastic member.

18. The method of claim 12 wherein the thermoplastic member is an injection molded, valve portion of a female incontinence device and the heat sensitive material is an adhesive used to secure a completed incontinence device to a female patient.

19. A method of completing a female incontinence device by coupling an adhesive to a thermoplastic member functioning as a valve and formed from an injection molding process, comprising:

securing the thermoplastic member into a heating block so that a first surface of the thermoplastic member is in contact with the heating block, and a second surface is exposed;

placing a layer of polyethylene over the second surface of the thermoplastic member;

placing a layer of heat sensitive adhesive over the layer of polyethylene;

placing a layer of release material over the heat sensitive adhesive;

pressing against the release layer to forcefully abut the layer of polyethylene against the second surface of the thermoplastic member;

heating the first surface of the thermoplastic member which in turn causes a portion of the polyethylene to become heated and melt;

limiting the heating of the polyethylene so as to prevent damage to the heat sensitive adhesive from the heat; and removing the thermoplastic member from heat and allowing it to cool, thus forming a permanent bond between the thermoplastic member and the polyethylene.

20. The method of claim 19 wherein the steps of placing the layers of polyethylene, adhesive and release material, include:

providing a sheet of polyethylene;

coating one surface of the sheet with a heat sensitive adhesive;

placing a sheet of the release material over the coating of adhesive; and die cutting the polyethylene, adhesive, and release material into a shape of the second surface of the thermoplastic member.

21. The method of claim 19 wherein the adhesive is a hydrogel.

22. The method of claim 19 wherein the polyethylene acts as an insulator, preventing the adhesive from becoming heated.

23. A method of completing a female incontinence device by coupling an adhesive to a thermoplastic member functioning as a valve, and formed from an injection molding process, comprising:

securing the thermoplastic member into a heating block so that a first surface of the thermoplastic member is in contact with the heating block, and a second surface is exposed;

placing a layer of intermediate material over the second surface of the thermoplastic member;

placing a layer of heat sensitive adhesive over the layer of intermediate material;

placing a layer of release material over the heat sensitive adhesive;

pressing against the release layer to forcefully abut the layer of intermediate material against the second surface of the thermoplastic member;

heating the first surface of the thermoplastic member which in turn causes a portion of the intermediate material to become heated and melt;

limiting the heating of the intermediate material so as to prevent damage to the heat sensitive adhesive from the heat; and removing the thermoplastic member from heat and allowing it to cool, thus forming a permanent bond between the thermoplastic member and the intermediate material.

24. The method of claim 23 wherein the steps of placing the layers of the intermediate material, adhesive and release material, include:

providing a sheet of the intermediate material;

coating one surface of the sheet with an adhesive;

placing a sheet of the release material over the coating of adhesive; and die cutting the intermediate material, adhesive, and release material into a shape of the second surface of the thermoplastic member.

25. The method of claim 23 wherein the adhesive is a hydrogel.

26. The method of claim 23 wherein the intermediate material acts as an insulator, preventing the adhesive from becoming heated.

27. The method of claim 23 wherein the intermediate material is chosen from a class of materials having a melting point that is lower than the melting point of the thermoplastic member.

28. The method of claim 23 wherein the intermediate material is polyethylene.

* * * * *